April 8, 1958     J. F. CASTAGNA     2,830,205
HIGH EFFICIENCY CONSTANT SPEED DIRECT CURRENT MOTOR
Filed March 28, 1955     2 Sheets-Sheet 1
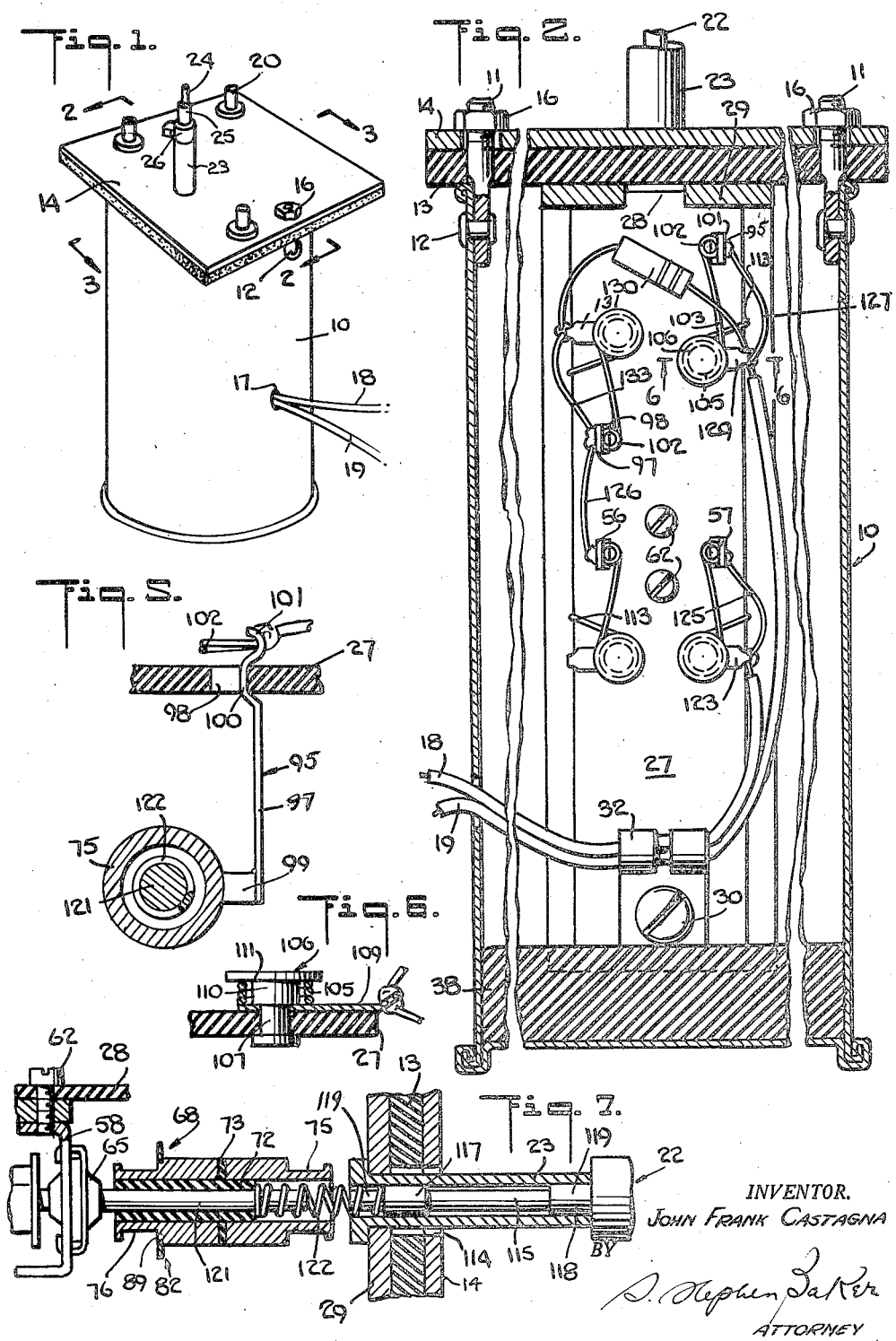
INVENTOR.
JOHN FRANK CASTAGNA
ATTORNEY April 8, 1958 J. F. CASTAGNA 2,830,205
HIGH EFFICIENCY CONSTANT SPEED DIRECT CURRENT MOTOR
Filed March 28, 1955 2 Sheets-Sheet 2
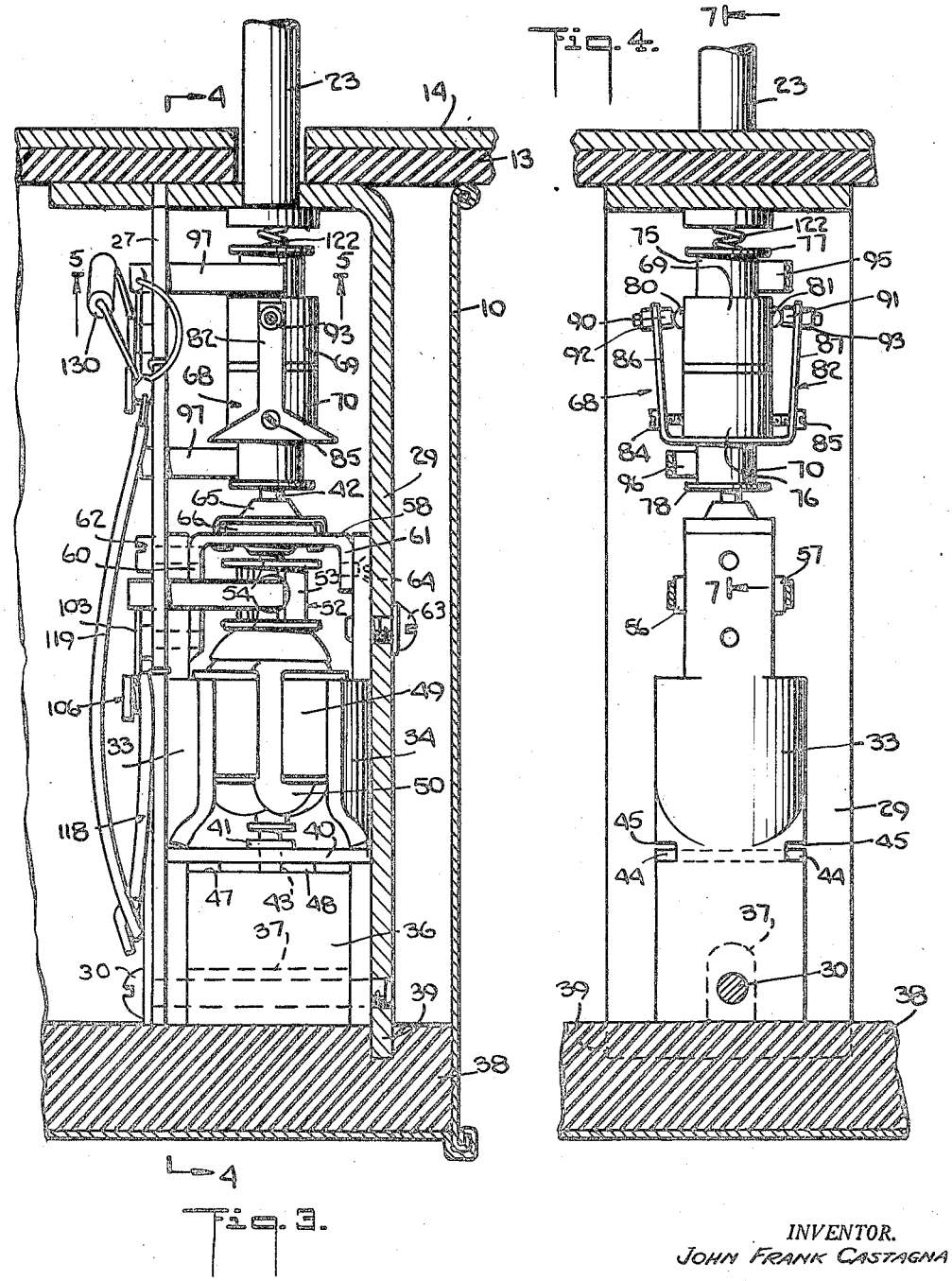
INVENTOR.
JOHN FRANK CASTAGNA
BY
ATTORNEY

United States Patent Office 2,830,205
Patented Apr. 8, 1958

2,830,205

HIGH EFFICIENCY CONSTANT SPEED DIRECT CURRENT MOTOR

John Frank Castagna, Brooklyn, N. Y.

Application March 28, 1955, Serial No. 497,260

7 Claims. (Cl. 310—68)

The present invention relates to a small compact high efficiency direct current motor suitable for battery operation. The motor is equipped with a governor having an exceptionally short response time and a high degree of precision in its speed control action, thus making the motor useful for driving the turntable of a portable battery operated radio-phonograph, for example.

The governor, which forms an important part of the invention, is carried by the armature shaft along with the commutator. The governor comprises a pair of tuned reed contact members having a frequency of resonance which is substantially equal to the frequency of rotation of the armature shaft at the desired constant speed so that rotation of the armature tends to cause vibration of the tuned reed members independently of the varying centrifugal forces to which they are subjected by speed variations of the motor armature. In accordance with the invention, the frequency of electromechanical resonance of the tuned reed members may be a multiple or submultiple of the rotational frequency of the armature.

Means are provided for causing the motor brushes to engage the commutator with effectively uniform evenly distributed contact pressure over a maximum area of contact to minimize the generation of small electrical arcs which generate accompanying radio frequency "hash" or interference producing objectionable noise in the phonograph loudspeaker. The governor contacts open and close in a sustained vibratory manner and variation in the relative durations of successive contact opening and closure intervals is utilized to obtain the desired constant motor speed.

The motor and its governor are enclosed in a common dust-tight enclosure. The vibration producing parts, when used with a radio-phonograph, are cushioned and so mounted that no appreciable vibration is transmitted to the turntable mechanism or to the chassis of the amplifier. This cushioned mounting avoids undesirable microphonic effects in the electroacoustic phonograph pickup and in the high gain amplifier which is ordinarily associated therewith.

The motor is provided with an armature, commutator and governor mounted on a common shaft and supported by a single pair of bearings. The armature shaft is connected by a resilient helical spring coupling to the motor output shaft to avoid the use of a long shaft which has an inherent tendency to whip. This feature also permits the use of a separate bearing for the output shaft without requiring accurate alignment of the motor output shaft with the motor armature shaft. Additionally, the resilient coupling tends to filter out any torque fluctuations of the armature which are of a vibratory nature and to prevent these fluctuations from reaching the phonograph turntable or other driven load.

Various additional objects, features and advantages of the invention will become apparent upon reading the following specification together with the accompanying drawing forming a part hereof.

Referring to the drawing:

Figure 1 is a perspective view showing the dust-tight enclosure for a motor embodying the invention, the motor being mounted therein;

Figure 2 is an enlarged sectional view in elevation taken along the line 2—2 of Figure 1, looking in the direction of the arrows;

Figure 3 is an enlarged fragmentary sectional view in elevation taken along the line 3—3 of Figure 1, looking in the direction of the arrows and at right angles to the line 2—2;

Figure 4 is a fragmentary sectional view in elevation taken along the line 4—4 of Figure 3, looking in the direction of the arrows;

Figure 5 is an enlarged sectional fragmentary detail view taken along the line 5—5 of Figure 3 and showing a brush in engagement with one of the slip rings through which electrical connection is established with the contacts of the governor;

Figure 6 is an enlarged sectional fragmentary detail view taken along the line 6—6 of Figure 1 and showing a fixed post which supports a brush pressure spring together with an electrical terminal; and Figure 7 is an enlarged fragmentary view in longitudinal section, rotated through 90 degrees, and taken along the line 7—7 of Figure 4 showing the body portion of the governor and a resilient helical spring coupling interconnecting the armature and output shafts.

Referring to Figure 1, the motor comprises a hollow cylindrical dust-tight enclosure member 10 which is closed at its lower end and open at its upper end. At its upper end the enclosure 10 is provided with a pair of diametrically oppositely disposed upwardly extending threaded studs 11 secured to the wall of enclosure 10 by eyelet type rivets 12. The studs 11 pass freely through an upper vibration cushion 13 and a top mounting plate 14. The top mounting plate 14 is preferably formed of sheet metal and the upper vibration cushion 13 is formed of sponge rubber cemented or otherwise secured to the underside of top mounting plate 14. Nuts 16 threaded on the upper end portions of studs 11 secure the enclosure 10 to the top mounting plate 14 with its upper edge engaging the lower surface of the upper vibration cushion 13.

The enclosure 10 is laterally apertured at 17 to receive a pair of conductors 18 and 19 for energization of the motor from a suitable direct current source (not shown). The top mounting plate 14 is provided with three interiorly threaded mounting fittings 20 which are adapted to be secured to the underside of a phonograph turntable mechanism (not shown) for mounting the motor for operation therewith.

A motor output shaft designated generally as 22 is journaled in a tubular sleeve type bearing 23 which extends above the top mounting plate 14. At its upper end, the output shaft 22 is provided with three drive wheel engaging surfaces 24, 25, and 26 which are arranged for frictional engagement with a rubber tired drive wheel (not shown) of a multi-speed phonograph turntable mechanism. The phonograph turntable mechanism comprises speed selection means for displacing the rubber tired drive wheel vertically for selective engagement with any one of the drive surfaces 24, 25 and 26. Advantageously, the surfaces 24, 25 and 26 will have diameters dimensioned to produce standard turntable speeds of 33⅓, 45 and 78 R. P. M., respectively, when engaged by the drive wheel. Details of the turntable mechanism do not require disclosure because the turntable consists of standard commercially available mechanism. The specific embodiment of a motor in accordance with the present invention which is herein illustratively described in detail is especially suited for use with a load of this character. The particular load which is to be driven, however, may be of any desired type and does not in and of itself concern the motor of the present invention which may be used to drive any type of load where constancy of speed is extremely critical and where low current drain is important, as in the case of a battery-operated motor.

Figure 2 shows a terminal board 27 formed of flat sheet insulating material as by punching, for example. The upper end of terminal board 27 is provided with a tongue 28 which fits into a cooperating slot formed in the upper horizontal end portion of an L-shaped frame member 29. The lower end of terminal board 27 is secured by a screw 30 which is threaded into the frame member 29 near its lower end. A wire clamp 32 which is fastened beneath the head of screw 30 holds the energizing conductors 18 and 19 to prevent external mechanical strain from being transmitted to the electrical connections on the terminal board 27.

The screw 30 also serves to clamp a pair of field pole piece members 33 and 34 against a permanent magnet 36. The magnet 36 is preferably a casting of permanent magnet material such as a cobalt-nickel-aluminum alloy, for example, having flat ground lateral surfaces for engagement with cooperating flat lower end portions of pole pieces 33 and 34. The magnet 36 has a groove 37 formed therein to clear the shank of screw 30.

A lower vibration cushion 38 is cemented to the lower end surface of magnet 36 and presses against the bottom of container 10. The lower cushion 38 is preferably of flat circular disc shape and, when free, is of a slightly larger diameter than the internal diameter of the container 10. The lower vibration cushion 38 is formed of sponge rubber or other suitable vibration absorbing material for resiliently holding the lower end portion of the frame member 29 against vertical and lateral movement and at the same time preventing the transmission of mechanical vibrations accompanying operation of the motor through the walls of the enclosure 10 to the top mounting plate 14. The frame member 29 comprises a downward extension 39 of its vertical leg which is embedded in the lower vibration cushion 38 and which enhances the cemented connection between magnet 36 and vibration cushion 38.

Disposed immediately above the magnet 36 is a lower end plate member 40 formed of non-magnetic material such as sheet brass. Press fitted or otherwise fixed in lower end plate member 40 is a lower bearing bushing 41 for the armature shaft 42 of the motor. The lower end plate 40 is secured by integrally formed projecting lugs 44 which engage in notches 45 in the edges of pole pieces 33 and 34. The lower tip 43 of armature shaft 42 is rounded and rests on the upper surface 47 of the magnet 36, the surface 47 being ground smooth to serve as a thrust bearing in conjunction with bushing 41. The bushing 41 projects below the lower end plate 40 and is encircled by a flat annular felt lubricant retaining washer 48.

A five pole armature 49 of conventional construction is fast on shaft 42 and comprises windings 50 connected to a commutator 52. The commutator 52 comprises five arcuate segments 53 secured between fiber supporting washers 54. The washers 54 are fast on armature shaft 42. A pair of commutator brushes 56 and 57 are mounted on terminal board 27 for engagement with the segments 53 of commutator 52. These brushes are described in greater detail below.

The armature shaft 42 extends upwardly through an upper end plate 58. The upper plate 58 is formed of non-magnetic material such as brass and comprises two downwardly extending leg portions 60 and 61. The upper end of pole piece 33 (Figure 3) is flat and is secured against leg portion 60 of plate 58 by screws 62 which pass through terminal board 27 and are threaded into leg portion 60. The upper end of pole piece 34 is flat and is secured against leg portion 61 of plate 58 by a countersunk flat headed screw 64 threaded into leg portion 61. The upper end of pole piece 34 is also fastened to the vertical leg of frame member 29 by a screw 63.

An upper bearing 65 for armature shaft 42 is provided in upper plate 58. Bearing 65 is of conventional construction for use in miniature motors and includes a felt lubricant retaining washer.

The armature shaft 42 extends upwardly beyond bearing 42 to support an electromechanically resonant centrifugal governor designated generally as 68. The governor 68 comprises upper and lower slip-ring members 69 and 70, respectively, which are fixedly mounted on a tubular sleeve 72 formed of suitable insulating material. The insulating sleeve 72 is fast on armature shaft 42. A flat washer 73 formed on insulating material is mounted on sleeve 72 and interposed between the adjacent end surfaces of slip-ring members 69 and 70 so that the slip-ring members 69 and 70 are fully individually insulated both from armature shaft 42 and from each other.

The slip-ring members 69 and 70 are provided with cylindrical contact surfaces 75 and 76 and outer end flanges 77 and 78 adjacent to the contact surfaces 75 and 76, respectively. The cylindrical contact surfaces 75 and 76 are of reduced diameter to reduce both brush wear and slip-ring wear.

The upper slip-ring member 69 carries a pair of relatively fixed contacts 80 and 81 formed of suitable electrical contact material. A centrally apertured contact yoke member 82 formed of resilient electrically conductive sheet material such as phosphor bronze or the like is mounted on lower slip-ring member 70 by means of tuning adjustment screws 84 and 85 which pass through resilient contact arm portions 86 and 87 of the yoke member 82. The oppositely directed tuning adjustment screws 84 and 85 also provide an electrical connection between yoke member 82 and lower slip-ring member 70. The central aperture 86 formed in the bottom of contact yoke member 82 is of sufficient diameter to pass over the flange 78 of lower slip-ring member 70 during assembly of the governor 68.

A pair of movable vibratory control contacts 90 and 91 are mounted near the upper free ends of resilient arm portions 86 and 87, and are formed of suitable electrical contact material for cooperation with the relatively fixed contacts 80 and 81, respectively. The movable vibratory contacts 90 and 91 are provided with shanks which pass through collars 92 and 93, the ends of the shanks being riveted over to secure the contacts 90 and 91 permanently to the yoke member 82. The individual weights of each of the two combined contact and collar assemblies 90—92 and 91—93 are selected to produce approximate resonance and thereby facilitate obtaining precise electromechanical resonance by minor tuning adjustment of screws 84 and 85. The complete contact and yoke unit 82, 90—92, 91—93 is balanced and its center of gravity is positioned at the rotational axis of armature shaft 42.

The upper slip-ring member 69 cooperates with a brush 95 and the lower slip-ring member 70 cooperates with a brush 96, both brushes being mounted on the terminal board 27.

Referring to Figures 5 and 6, the mounting of brush 95 in terminal board 27 is shown in detail and the other three brushes 56, 57 and 96 are similarly constructed and arranged. Each brush comprises a brush arm 97 which extends freely through a rectangular slot 98 formed in terminal board 27. A contact block 99 of carbon, impregnated carbon or other suitable brush material is soldered or otherwise secured to brush arm 97 near its lower free end and engages the contact surface 75 of upper slip-ring member 69. Near its upper end, the brush arm 97 is formed with an off-set jog portion 100 which laterally engages terminal board 27 and acts as a combined guide and pivot for the brush arm 97, restraining the brush arm 97 against longitudinal movement in the slot 98. The slot 98 is of sufficient size, however, to permit the passage therethrough of jog portion 100 during assembly of the motor.

Adjacent to its upper end, the brush arm 97 has a narrow groove 101 formed therein which receives the rounded free end 102 of the radially extending arm 103 of a helical torsion spring 105. The torsion spring 105 is wound around a rivet 106. The rivet 106 is secured to terminal board 27 by a shank portion 107 which passes therethrough and is riveted over at its lower end. A flat soldering terminal 109 is secured to terminal board 27 by an intermediate portion 110 of rivet 106 which is of enlarged diameter. The torsion spring 105 is held on intermediate portion 110 of rivet 106 between a flat head portion 111 of rivet 106 and the soldering terminal 109. The other arm of torsion spring 105 terminates in a hook portion 113 which engages the lateral edge of terminal board 27.

The rounded free end 102 of the arm 103 of torsion spring 105 engages the upper end of brush arm 97 at or near its longitudinal axis in groove 101. This assures that the pressure exerted on brush arm 97 will have no appreciable component tending to rotate arm 97 about its own longitudinal axis and that the pressure applied to contact block 99 will be uniformly distributed as block 99 progressively wears away. This uniform pressure causes uniform current distribution in the contact block 99 thereby minimizing the production of any radio interference producing arcs.

The output shaft bearing 23 is rigidly fixed to the upper end of L-shaped frame member 29 and passes through a relatively large clearance hole 114 formed in the top mounting plate 14. The hole 114 provides sufficient clearance to prevent the transmission of mechanical vibration from bearing 23 to top mounting plate 14.

The output shaft 22 (Figure 7) is reduced in diameter at 115 to provide narrow bearing surfaces 117 and 118 which engage bearing 23 for reducing bearing friction. The inner end 119 of output shaft 22 is of reduced diameter and the upper end 121 of armature shaft 42 is of the same diameter. A helical spring coupling member 122 fits snugly yet readily removably over the ends 119 and 121 of armature and output shafts 42 and 22. The end of coupling member 122 on shaft end 119 clears bearing 23 and the other end of coupling member 122 on armature shaft end 121 extends within upper slip-ring member 69 with adequate clearance to prevent contact therewith. The direction of pitch and the frictional fit between helical spring coupling member 122 and the shaft ends 119 and 121 which it interconnects provide a sufficient degree of frictional engagement so that torque transmitted in the rotational direction of operation of the motor will tighten the spring coupling 122 upon the shaft ends 119 and 121 thereby increasing the frictional engagement for torque transmission from armature shaft 42 to output shaft 22. Torque in the reverse direction conveniently loosens the coupling member 122 for assembly or disassembly.

The electrical energizing circuit for the motor may be seen in Figure 2. Energizing conductor 18 is soldered to a terminal 123 similar to terminal 109 described above. A flexible pigtail 125 connects terminal 123 to commutator brush 57. The circuit extends from brush 57 through commutator 52 and armature windings 50 to the other commutator brush 56. Brush 56 is connected by a flexible pigtail 126 to the lower slip-ring brush 96. From brush 96 the circuit extends through the resonant governor 68 to upper slip-ring brush 95 which is connected by a flexible pigtail 127 to a terminal 129 to which conductor 19 is also connected to complete the motor energizing circuit.

A small resistor 130 is connected from terminal 129 to a terminal 131 associated with lower slip-ring brush 97. Brush 97 is connected to terminal 131 by a flexible pigtail 133. The resistor 130 is thus connected in multiple with the vibratory governor contacts 80—90 and 81—91 so that the energizing circuit through conductors 18 and 19 and armature windings 50 may be increased in resistance by the serial inclusion of resistor 130 therein but will not be completely interrupted. The minimum resistance value of resistor 130 is determined by the amount of control effect which must be obtained when vibratory governor contacts 80—90 and 81—91 are open and the maximum value by the permissible amount of arcing which may be tolerated at the vibratory contacts 80—90 and 81—91. Such arcing causes radio frequency interference and also shortens the contact life.

Advantageously, the resistor 130 may take the form of a self-heating filament with a high temperature coefficient of resistance. At the instant of contact opening its resistance is at a minimum value to prevent arcing and it rises rapidly to a higher value which serves to produce a substantial decrease in the current flow through the armature windings 50 and an accompanying increased control effect.

Alternatively, the resistor 130 may consist of or may comprise any other suitable form of non-linear resistance element. Such non-linear resistance element must have an initial resistance which is at a minimum when no voltage is applied to the resistor 130. As soon as the contacts 80—90 and 81—91 both open, however, the resistance value of resistor 130 must rise rapidly to exert a maximum control effect on the armature current.

In operation, the energizing conductors 18 and 19 may extend to a 4½ volt dry cell battery or a small rectifier (not shown). Assume, for example, that the correct shaft speed for armature shaft 42 is 2400 R. P. M. which corresponds to a rotational frequency of 40 cycles per second. The control contacts 90 and 91 together with their respective collars 92 and 93 are selected to have a weight which will produce a natural period in connection with resilient arms 86 and 87 of approximately 40 cycles per second. The control contacts 90 and 91 are tuned by tuning adjustment screws 84 and 85 so that they tend to engage and disengage the relatively fixed contacts 80 and 81 respectively at a frequency of 40 cycles per second because of their tuned resonant period. As a result, the resistor 130 will be cut into the circuit of armature windings 50 periodically at a rate of 40 cycles per second. Any increase in the speed of armature shaft 42 will cause the contacts to remain open during a greater portion of each cycle and conversely any decrease in the speed of shaft 42 will cause them to remain closed during a longer portion of each cycle. For large deviations, the contacts will be predominantly controlled by centrifugal forces which cause them to remain continuously open or closed until correct speed is approached. In this manner, the governor contacts respond substantially instantaneously with any slight change in shaft speed. Additionally, these continuous fluctuations in armature current produce accompanying fluctuations in torque which tend to impart a self-sustained oscillatory nature to the contact vibrations at and near the correct armature speed. The resulting small torque fluctuations are filtered out by the helical coupling spring 122 so that they do not affect the load driven by output shaft 22.

Arcing upon contact breaking will take place at the particular control contact 90 or 91 which is last to open and will therefore tend to wear this contact down until the cooperating pairs of contacts 80—90 and 81—91 open simultaneously and therefore close simultaneously. The wear due to contact arcing is thus distributed between the two pairs of contacts and is self-equalizing.

There has been shown what is now considered a preferred embodiment of the invention but it is obvious that numerous changes and omissions may be made there without departing from its spirit.

What is claimed is:

1. A constant speed device of the class described, comprising a revoluble shaft, driving means of controllable speed for driving said shaft, an electrical circuit connected to said driving means for controlling the speed thereof, a pair of cooperating contacts driven with said shaft and connected to said circuit for speed control of said driving means, at least one of said contacts being eccentrically mounted with respect to the rotational axis of said shaft, and means acting on at least one of said contacts and mechanically resonating said contact to tend to open and close in a vibratory manner at a predetermined fixed frequency which is directly proportional to the frequency of rotation of said shaft when operating at said constant speed.

2. A constant speed direct current motor of the class described, comprising a frame member, an electric motor carried by said frame member, said motor comprising an armature mounted on an armature shaft, an energizing circuit for said armature, and mechanically resonant governor means carried by said armature shaft, said governor comprising at least one pair of electrical contacts tuned to resonance at a predetermined frequency, said contacts being connected with said energizing circuit for causing said armature shaft to rotate at a predetermined frequency of revolution which is directly proportional to said frequency of resonance, a motor output shaft revolubly mounted in said frame member and aligned with said armature shaft, and resilient coupling means interconnecting said armature and output shafts whereby torque fluctuations arising from vibratory control of said energizing circuit by said contacts will be mechanically filtered between said two shafts.

3. A motor according to claim 2, wherein said contacts are serially included in said energizing circuit, said motor further comprising resistor means connected in multiple with said contacts, said resistor means having a resistance value which increases with increasing voltage applied to said resistor.

4. The method of increasing the speed of response of a centrifugal governor which governor comprises at least one resiliently movable centrifugally operated contact member selectively engageable with and disengageable from another contact member in response to deviations in the rotational speed of said governor from a predetermined speed, said method comprising the step of mechanically tuning said movable contact member to have a frequency of resonance which is directly proportional to the frequency of rotation of said governor at said predetermined speed.

5. The method according to claim 4 wherein said frequency of resonance is equal to said frequency of rotation.

6. A constant speed device of the class described, comprising a revoluble shaft, a dynamically balanced yoke member carried by said shaft and having a plurality of resiliently movable arm portions extending generally symmetrically with respect to the rotational axis of said shaft in spaced and substantially parallel relation thereto, a plurality of movable contact members each carried by one of said arm portions, the combined center of gravity of said yoke member and said movable contact members lying substantially on said rotational axis of said shaft, cooperating contact means carried by and relatively fixed with respect to said shaft and engageable by said movable contact members, resilient means yieldingly urging said movable contact members to engage said cooperating fixed contact means, the action of said resilient means being overcome by centrifugal force acting on said yoke member and on said movable contact members to disengage all of said movable contact members from said cooperating contact means when said shaft speed exceeds a predetermined speed, resonating means tuning said arm portions and said movable contact members to have a frequency of mechanical resonance which is directly proportional to a predetermined speed of rotation of said shaft, and circuit means connected to said driving means, to said movable contact members and to said cooperating contact means for causing said shaft to rotate constantly at said predetermined speed.

7. A device according to claim 6, wherein said arm portions are two in number and are diametrically oppositely disposed with respect to the rotational axis of said shaft.

References Cited in the file of this patent
UNITED STATES PATENTS

| | | |
|---|---|---|
| 854,121 | Storer | May 21, 1907 |
| 981,869 | Miller | Jan. 17, 1911 |
| 1,576,720 | Cheney | Mar. 16, 1926 |
| 1,587,763 | De Wrangel | June 8, 1926 |
| 1,757,696 | Wood | May 6, 1930 |
| 1,820,442 | Cooper | Aug. 25, 1931 |
| 1,855,703 | Cloud | Apr. 26, 1932 |
| 2,103,589 | Lee et al. | Dec. 28, 1937 |
| 2,237,916 | Schwarz et al. | Apr. 8, 1941 |
| 2,295,305 | Summers | Sept. 8, 1942 |
| 2,345,429 | Hanna | Mar. 28, 1944 |
| 2,617,904 | Anderson | Nov. 11, 1952 |
| 2,738,391 | Tesh | Mar. 13, 1956 |